July 21, 1970 J. G. HURT, JR 3,521,258

TRANSDUCER WITH THIN MAGNETIC STRIP, DRIVE WINDING AND SENSE WINDING

Filed June 7, 1963 3 Sheets-Sheet 1

WITNESSES

Theodore F. Wrobel

Leon M. Garman

INVENTOR

John G. Hurt, Jr

BY Dean Schron

ATTORNEY

United States Patent Office 3,521,258

Patented July 21, 1970

3,521,258

TRANSDUCER WITH THIN MAGNETIC STRIP, DRIVE WINDING AND SENSE WINDING

John G. Hurt, Jr., Baltimore, Md., assignor to Westinghouse Electric Corporation, Pittsburgh, Pa., a corporation of Pennsylvania

Filed June 7, 1963, Ser. No. 286,348
Int. Cl. G11b *5/28, 5/30*
U.S. Cl. 340—174.1 6 Claims

ABSTRACT OF THE DISCLOSURE

The transducer consisting of thin magnetic strip with a longitudinal axis and a drive and a sense winding. The magnetic strip has a certain flux operating point which is influenced by the magnetic field of the magnetically encoded member which is to be read. After a drive pulse is provided to the drive winding, the sense winding will provide an output indicative of the change of flux operating point which in turn is dependent upon the magnetic polarity of the record.

This invention in general relates to decoding means, and more particular to a magnetic reading head for obtaining an electrical representation of a magnetically encoded member.

In the information storage field, particularly with respect to digital computers, use is made of discrete magnetically encoded areas for representing stored information. These discrete magnetically encoded areas may be located on magnetic drums, cards, tapes or the like. For transferring information to a computer use may be made of an analog-to-digital converter, one example of which is a shaft encoded disk which generally comprises a plurality of tracks made up of these discrete magnetic areas which will provide a digital representation of the amount of rotation of the disk. These discrete magnetically encoded areas are generally written into a magnetic member having a magnetic material thereon such that a magnetic bit appears in the plane of the magnetic material with a north pole and a south pole of the bit located at the surface of the material. The magnetic member is then moved relative to a magnetic readout means which senses a change from one pole to an opposite pole thereby providing a pattern of electrical pulses representing either a binary "1" of "0". In order to have an extremely high resolution system the magnetic bits must be extremely small and to this end there has been proposed a system wherein only one pole of a magnetic bit is used to represent a binary state and the opposite pole is used to represent an opposite binary state. The magnetic pattern is written into a magnetic member in a substantially perpendicular direction to the surface of the member such that a short bar magnetic quantum is written with only one of two possible poles appearing at the surface of the magnetic member, as are subsequent bits, to achieve a desired magnetically encoded pattern. To read the tiny area defined by a single pole of a magnetic bit therefore requires an extremely high resolution magnetic reading head. Conventional ferrite toroidal cores are severely limited in the minimum size practical since a ferrite toroidal core having a thickness in the order of a few mils or less is very brittle and therefore susceptible to breakage.

In another type of information storage there is provided an elongated magnetic strip which has information in the form of magnetic bits recorded thereon such that each bit is magnetized in a transverse direction to the elongation and consequently a single magnetic pole appears at the edge of the strip. This type of storage is generally used for identification purposes and the need for extremely high resolution is therefore not present. Ferrite toroidal cores of sufficient size are then utilized to read the magnetic poles appearing at the edge of the magnetized strip. A reading head comprising a plurality of these ferrite toroidal cores are positioned in operative relationship with the magnetic bits and are then moved relative to them to produce a pattern of electrical pulses which will be provided only when there is a relative movement.

It is therefore one object of the present invention to provide a magnetic sensing head for reading a magnetically encoded area, which does not have to be moved relative to the area in order to read it.

Another object is to provide a magnetic sensing head which is capable of reading extremely high resolution magnetically encoded areas.

It is another object of the present invention to provide a magnetic reading head of a simple mechanical assembly.

It is another object to provide an improved magnetic reading head which will produce a two polarity output signal.

It is a further object to provide a magnetic sensing head which will not destroy the magnetically encoded areas being read.

Briefly, in accordance with the above objects there is provided a magnetic reading unit comprising a plurality of thin magnetic strips, or the like, with each having a longitudinal axis. The reading unit, with these thin magnetic strips is placed contiguous to a magnetically encoded area such as an analog-to-digital shaft encoder, a magnetically encoded drum, card, tape, or the like. Each of the thin magnetic strips has a certain flux operating point which is influenced by the magnetic field of the magnetically encoded area of the member to be read. Drive means are associated with each of the thin magnetic strips in addition to sense means, which may take the form of windings around each particular thin magnetic strip. After a drive pulse is provided on the drive means, the sense means will provide an output signal indicative of the change of flux operating point which is in turn dependent upon the particular magnetic pole contiguous to the thin magnetic strip. To provide a two polarity output signal, indicative of a north pole or a south pole, a like plurality of thin magnetic strips is provided with each of the plurality containing drive and sense means and disposed at a distance from the magnetically encoded member to be relatively unaffected thereby. The sense means of each of these latter plurality of thin magnetic strips is connected in series opposition with a corresponding sense winding of the first plurality of thin magnetic strips. The signal across the sense winding of a thin magnetic strip in the first polarity is either less than, or greater than, the signal across the sense winding of a corresponding thin magnetic strip of the second plurality, thereby resulting in two types of output signals appearing across the terminals of the two sense windings in series. The above stated, and further objects of the present invention will become apparent upon a reading of the following detailed specification taken in conjunction with the drawings in which:

Figure 1:
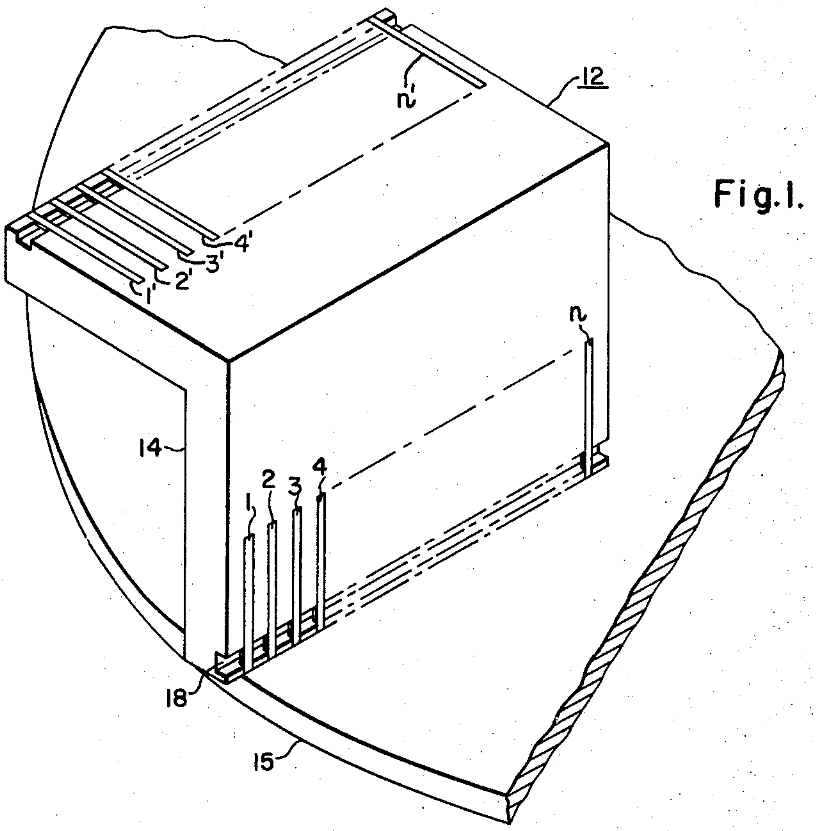
FIG. 1 is a perspective view of a preferred embodiment of the invention.

Referring now to FIG. 1, there is shown a typical sensing, or reading unit 12 in accordance with the teachings of the present invention. The reading unit 12 comprises a plurality of individual magnetic reading heads labeled 1 through *n*, suitably mounted on a support member 14. Each individual reading head 1 through *n* of the plurality has a longitudinal axis which is substantially parallel to the longitudinal axes of the other reading heads of the plurality, and each longitudinal axis is normal to a magnetically encoded member such as the analog-to-digital shaft encoded disk 15. In order to accommodate drive and sense means, there is provided a longitudinal groove 18 at the lower end of the support member 14 and in the vicinity of the lower ends of the axes of the reading heads 1 through *n*. The reading heads 1 through *n* are contiguous to magnetically encoded areas on the disk 15 and are thereby influenced by these magnetically encoded areas and as such, will be hereinafter called the active heads. In order to provide a dual polarity output signal, representative of the magnetically encoded areas to be read, there is provided a second plurality of reading heads 1' through *n'* herein termed the balance heads which are disposed from the encoded disk 15 so as not to be affected by the magnetically encoded areas, and including a longitudinal groove 18' for accommodation of drive and sense means to be hereinafter described. Each individual reading head is comprised of a thin strip of magnetic material and to this end reference is now made to FIG. 2.

Figure 2:
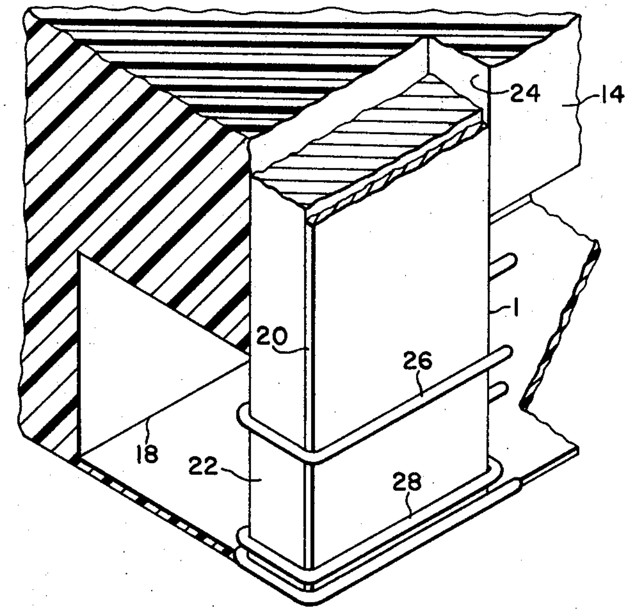
FIG. 2 is an enlarged fragment view in perspective, of FIG. 1.

In FIG. 2 there is shown a typical reading head 1 including a thin magnetic strip 20 preferably made of a high permeability magnetic material upon a suitable backing member 22 which may be recessed in a groove 24 of the support member 14. Located at the lower end of the longitudinal axis of the magnetic reading head 1 are drive and sense means in the form of drive windings 26 and sense windings 28 which may be wound about the thin magnetic strip 20 and the backing material 22, to be accommodated in the groove 18 of the support member 14. The reading head thus described is enabled to read extremely high resolution magnetically encoded areas and to this end reference is now made to FIG. 3.

Figure 3:
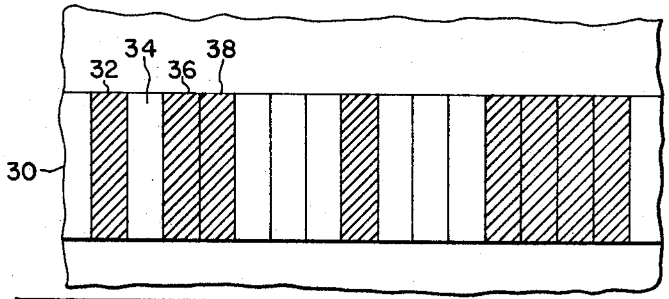
FIG. 3 illustrates one type of magnetically encoded member.

In FIG. 3 there is shown a portion of a magnetically encoded member in the form of a track 30 which may represent a portion of a shaft encoded disk, a magnetically coded drum, card, or the like. The track 30 is seen to comprise a plurality of individual discrete areas which represent either a magnetic north pole or a magnetic south pole. The discrete area 32 shown shaded may represent the north pole of a magnetic quantum written into a magnetic member, and which north pole may be indicative of a binary "1." Adjacent the north pole area 32 is shown a south pole area 34 which may represent a binary "*o*." The next two adjacent areas 36 and 38 may again represent a binary "1" and successive north or south poles appearing at the surface of the track complete the magnetic encoding. One such method of obtaining a high resolution track with a north or south pole appearing at the surface of a magnetic member to be encoded is more fully described and claimed in a copending application Ser. No. 277,839, filed May 3, 1963 now U.S. Pat. No. 3,452,358 entitled "Magnetically Encoded Device" by David W. Zehner and assigned to the assignee of the present invention. A typical positioning of the reading unit of the present invention for reading discrete magnetically encoded areas such as shown in FIG. 3 is shown in more detail in FIG. 4.

Figure 4:
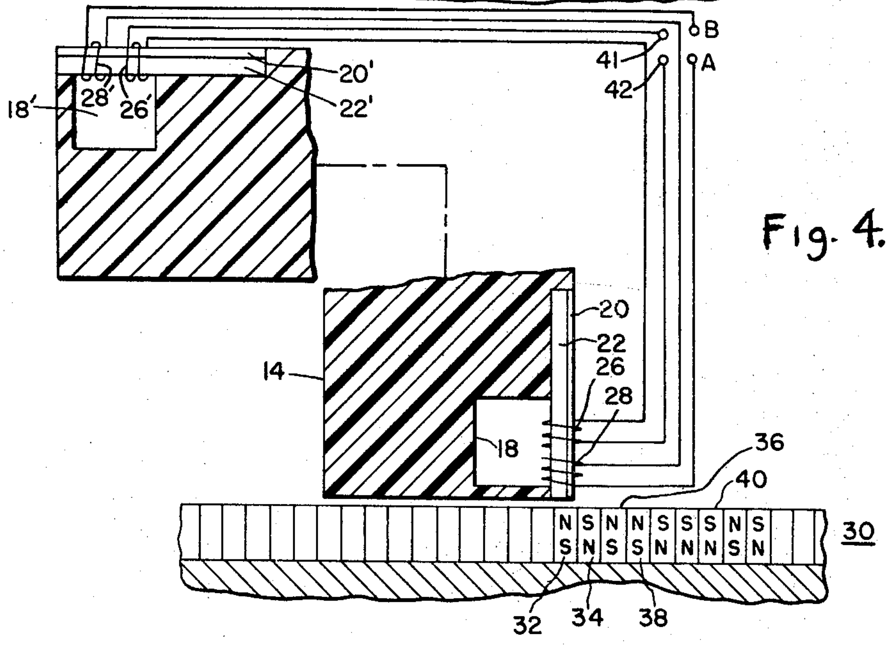
FIG. 4 is a fragment side view of the unit of FIG. 1 including electrical windings.

In FIG. 4 there is shown the magnetically encoded track 30 with a first discrete area 32 comprising a north pole of a short bar magnetic quantum appearing at the surface 40. The thin magnetic strip 20 is placed contiguous to the discrete area preferably in a normal direction. The thin magnetic strip 20 has a predetermined flux operating point which is therefore influenced by the magnetic field emanating from the north pole of the discrete area 32. Also shown is an associated balance head which has been designated with primed reference numerals corresponding to the same components of the read head, and which is located relative to the track 30 so as to be uninfluenced by the magnetic fields at the surface 40. With the thin strip of magnetic material 20 placed above the discrete area 34 representing a south pole, the flux operating point will be influenced in a reverse direction as will hereinafter be described. The thinness of the thin strip of magnetic material 20 is such that it is able to sense a south pole located between two north poles, where the width of the pole is in the order of less than 1 mil. One end of the active head drive winding 26 is connected to one end of the balance head drive winding 26', and the other ends of windings 26' and 26 are connected to terminals 41 and 42 respectively to which is applied a suitable drive waveform. One end of the active head sense winding 28 is connected to one end of the balance head sense winding 28' and the other ends of these windings are connected to output terminals A and B.

Figure 9:
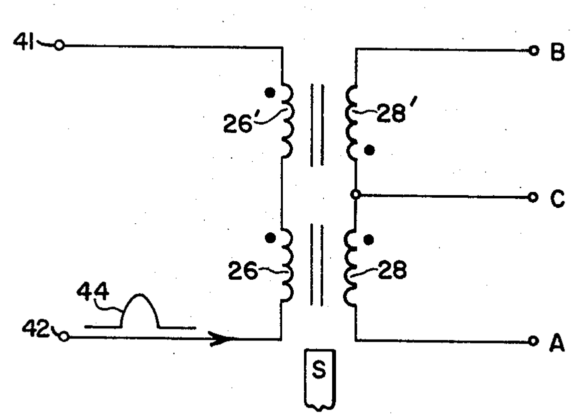

The operation of a reading head including just an active head and not a balance head, such as shown in FIG. 2 may be briefly, as follows:

The drive winding 26 is supplied with a suitable drive waveform such as a unidirectional current pulse which will induce, in the sense winding 28 a pulse of positive polarity during the current rise time and a pulse of negative polarity during the current decay time. If the thin strip of magnetic material 20 is positioned contiguous to a north pole for example, the magnitude of a voltage pulse on the sense winding will increase, and if brought near the south pole the magnitude of the voltage pulse on the sense winding will decrease and an indication may therefore be obtained as to the type of pole contiguous to the magnetic strip by a measurement of the magnitude of the pulse on the sense winding. The difference in magnitude of a pulse produced when the thin magnetic strip is contiguous to a north pole as compared to the voltage pulse produced when the thin strip is contiguous to a south pole may be relatively small. To obtain a more discernible signal indicative of a north pole, or a south pole being read, the arrangement illustrated in FIG. 4 may be utilized and to this end reference should be made to the circuits in FIGS. 5, 7 and 9.

Figure 5:
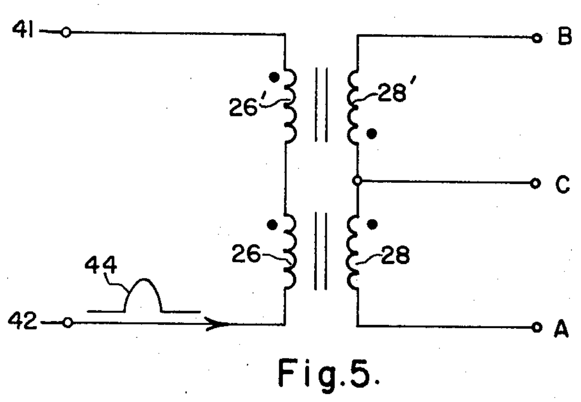
FIGS. 5, 7 and 9 illustrate electrical schematic diagrams of the drive and sense windings associated with a typical reading head.
Figure 6:
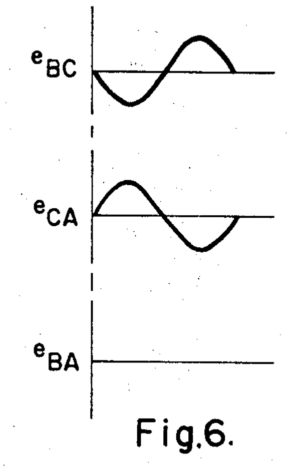
FIGS. 6, 8 and 10 are illustrative wave forms occurring in the circuits of FIGS. 5, 7 and 9.
Figure 7:
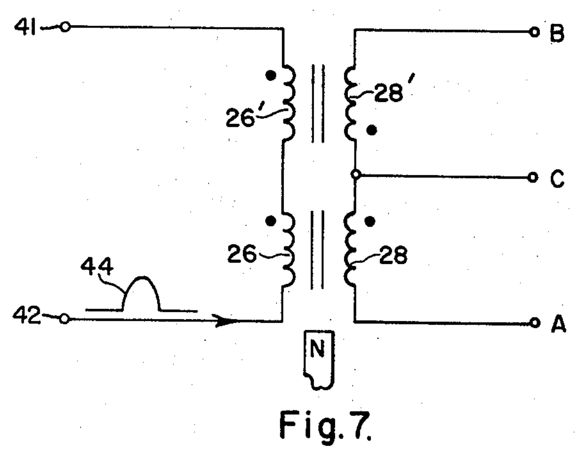
Figure 8:
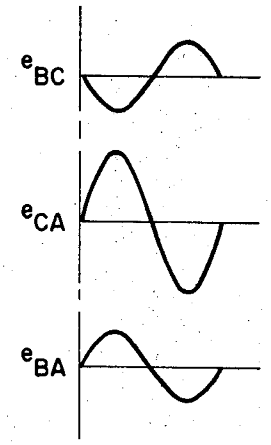
Figure 10:
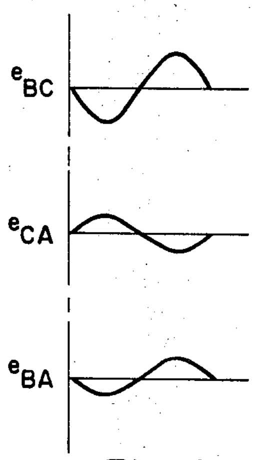

FIG. 5 is an electrical schematic diagram of the windings associated with one head of reading unit 12 in order to obtain a two polarity output signal. The windings associated with other heads of the reading unit are identical to that shown in FIG. 5. Winding 26 represents a drive winding of an active head, and winding 28 represents the associated sense winding, with the dot convention showing these two windings as having the same polarity. Winding 26' designates a drive winding associated with a reading head of the balance group and 28' represents its associated sense winding, with the dot convention showing these two to be of the opposite polarity. It is seen that windings 26 and 26' are in series aiding configuration and sense windings 28 and 28' are in series opposition configuration. A drive pulse 44 is supplied to the drive windings 26 and 26' by means of terminals 41–42 and with the reading head not influenced by any magnetic field, the voltage appearing across winding 28, that is voltage $e_{CA}$, will as shown in FIG. 6, increase positively in the first half cycle during the current rise time of the drive pulse 44, and increase in a negative direction during the second half cycle, as caused by the current decay of drive pulse 44. Since the windings 26' and 28' are of opposite polarity, the voltage across winding 28', that is voltage $e_{BC}$ will, as shown in FIG. 6, increase in a negative direction during the first half cycle and increase in a positive direction during the second half cycle during the current decay time, the resultant output voltage $e_{BA}$ shown in FIG. 6 thus being zero, as the voltage $e_{CA}$ and $e_{BC}$ will cancel each other out during the respective first and second halves of the cycle. Suppose now that the reading head is placed contiguous to a north pole area as shown in FIG. 7. With the magnetic field emanating from the north pole, the change in flux is enhanced, and the drive pulse 44 in the drive windings 26 and 26' causes a voltage to be produced by sense winding 28, which voltage is shown in FIG. 8 as $e_{CA}$ and is seen to increase in a positive direction during the first half cycle and increase in a negative direction during the second half cycle. Since the thin magnetic strips of the balance head are not affected by the magnetic field of the north pole, sense winding 28' will produce the voltage wave form $e_{BC}$ of FIG. 8 as demonstrated with respect to FIGS. 5 and 6. Since the flux change is enhanced, the voltage $e_{CA}$ increases, in the first half cycle by an amount more than the voltage $e_{BC}$ decreases to thereby provide a resultant voltage $e_{BC}$ which is positive in the first half cycle and negative in the second half cycle thus giving an indication that the reading head is contiguous to a north pole area. Suppose now the reading head is brought contiguous to a south pole area as in FIG. 9; in this instance the flux emanating from the south pole retards the flux change and a drive pulse 44 will produce, in the sense winding 28, a voltage $e_{CA}$ as shown in FIG. 10 which increases slightly in the first half cycle in a positive direction and increases slightly in the second half cycle in a negative direction. As was the prior case, the voltage waveform produced by the sense winding 28' is shown as $e_{BC}$ and the resultant voltage therefore $e_{BA}$, increases in a negative direction in the first half cycle and is positive in the second half cycle thus giving an indication of a south pole. The assumptions of polarity demonstrated with respect to FIG. 7 and FIG. 9, indicating a north or a south pole are arbitrary and the circuit and components may be arranged such that a negative pulse in the first half cycle is produced when the reading head is contiguous to a north pole and a positive pulse in the first half cycle when contiguous to a south pole. Thusly it has been demonstrated that the apparatus of the present invention will provide a two polarity output signal which may arbitrarily be utilized as a binary "1" and a binary "0." The output signal is derived without the necessity for the reading head to move relative to the magnetically encoded area being read.

Figure 11:
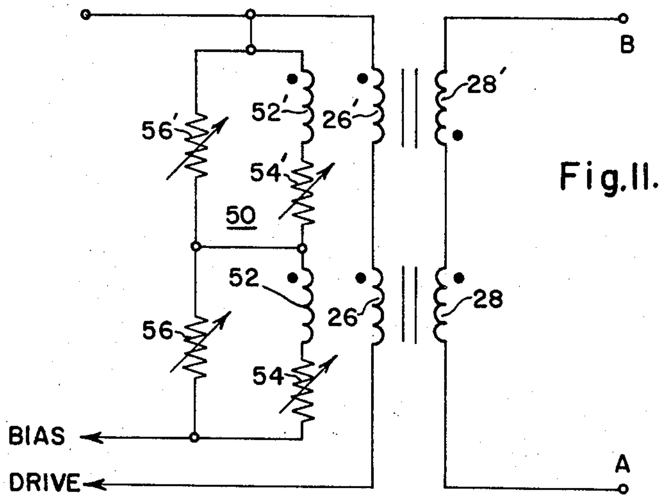
FIG. 11 illustrates an electrical schematic diagram of another embodiment of the present invention.

In order to allow small differences between the thin strip magnetic members to be balanced out, there may be provided biasing means 50 for the magnetic reading heads, such as shown in FIG. 11. In addition to the drive winding 26 and the sense winding 28 associated with the active head there is provided a bias winding 52 and associated current control resistors 54 and 56. In a similar manner, in addition to the drive winding 26' and the sense winding 28' associated with the balance head, there is provided a bias winding 52' in conjunction with current controlling resistors 54' and 56'. In operation, the current through the biasing means 50 is so chosen such that a predetermined bias is placed on the thin magnetic strip to provide a zero output signal in the absence of any magnetic field as was the case with respect to FIGS. 5 and 6. In addition, the biasing means 50 can bias the thin magnetic strip to a point on its associated B–H loop where the change in flux may be made a maximum, to obtain a maximum output signal from the sense windings.

Although the present invention has been described with a certain degree of particularity, it should be understood that the present disclosure has been made by way of example and that modifications and variations of the present invention are made possible in the light of the above teachings.

What is claimed is:

1. A magnetic reading head comprising:
- support means;
- a first thin strip of magnetic material positioned thereon and having a longitudinal axis;
- first drive and sense windings associated with said first thin strip;
- one end of said longiutdinal axis adapted to be positioned contiguous to a magnetically encoded member to be read;
- a second thin strip of magnetic material having a longitudinal axis and disposed from said magnetically encoded member such that it is unaffected thereby;
- second drive and sense windings associated with said second thin strip;
- said first and second sense windings connected in series opposition and said first and second drive windings connected in series aiding configuration.

2. A magnetic reading head as in claim 1 wherein said drive and sense windings are positioned near one end of said longitudinal axis.

3. A magnetic reading head as in claim 2 wherein said one end is the end contiguous to a magnetically encoded member to be read.

4. A magnetic reading head comprising:
- support means;
- a first thin strip of magnetic material positioned thereon and having a longitudinal axis;
- first drive and sense windings associated with said first then strip;
- said thin magnetic strip adapted to be positioned contiguous to a magnetically encoded member to be read;
- a second thin strip of magnetic material disposed from said magnetically encoded member such that it is uninfluenced thereby;
- second drive and sense windings associated with said second thin strip;
- said first and second sense windings connected in series opposition and said first and second drive windings connected in series aiding configuration;
- a bias winding for at least one of said first and second thin magnetic strips for controlling a predetermined flux operating point of the strip.

5. A magnetic sensing unit for reading a magnetically encoded member having a plurality of magnetically encoded areas, comprising:
- a first plurality of thin magnetic strips each adapted to be positioned contiguous to a different one of said magnetically encoded areas;
- first drive means for inducing a change in flux of each said thin magnetic strip, said change being enhanced or retarded in accordance with the particular magnetic area contiguous to each said then magnetic strip;
- a second, and like plurality of thin magnetic strips disposed from said magnetically encoded areas so as to be unaffected thereby;
- second drive means associated with said second plurality of thin magnetic strips;
- sense means associated with each thin magnetic strip of said first and second plurality and arranged in circuit configuration such that the sense means associated with a thin magnetic strip of said first plurality is in series opposition with a sense means associated with a thin magnetic strip of said second plurality.

6. A magnetic reading unit comprising:
- support means;
- a first plurality of thin magnetic strips each having a longitudinal axis and supported on said support means such that the longitudinal axes of said strips are parallel to one another and normal and contiguous to a magnetically encoded member to be read, said member having a plurality of discrete magnetic areas;

a second and like plurality of thin magnetic strips disposed from said magnetically encoded member such that they are substantially unaffected by any magnetic field emanating therefrom;

drive means associated with said first and second plurality of thin magnetic strips for supplying a current wave form to induce a predetermined change in flux of each said thin magnetic strips, with said change in flux of the thin magnetic strips of said first plurality being enhanced or retarded in accordance with the polarity of said discrete magnetic areas contiguous to said thin magnetic strips;

sense means associated with the individual thin magnetic strips of said first and second plurality for sensing said change in flux to provide an output signal;

said drive and sense means arranged in circuit configuration such that when a particular thin magnetic strip is contiguous to a discrete north pole magnetic area said output signal is of a first polarity and when contiguous to a discrete south pole magnetic area, said output signal is of an opposite polarity.

References Cited

UNITED STATES PATENTS

| | | | |
|---|---|---|---|
| 3,251,054 | 5/1966 | Simon | 340—347 |
| 3,196,450 | 7/1965 | Chapin | 346—74 |

OTHER REFERENCES

Proebster, W. E.: "Magnetic Transducer," IBM Technical Disclosure Bulletin, vol. 5, No. 5, October 1962.

BERNARD KONICK, Primary Examiner

V. P. CANNEY, Assistant Examiner

U.S. Cl. X.R.

346—74